US012088019B2

(12) United States Patent
Wei et al.

(10) Patent No.: US 12,088,019 B2
(45) Date of Patent: Sep. 10, 2024

(54) ANTENNA STRUCTURE AND ELECTRONIC DEVICE

(71) Applicant: WISTRON NEWEB CORPORATION, Hsinchu (TW)

(72) Inventors: Shih-Chiang Wei, Hsinchu (TW); Yung-Chieh Yu, Hsinchu (TW); Hsieh-Chih Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 130 days.

(21) Appl. No.: 18/152,833

(22) Filed: Jan. 11, 2023

(65) Prior Publication Data

US 2024/0014555 A1 Jan. 11, 2024

(30) Foreign Application Priority Data

Jul. 6, 2022 (TW) ................................. 111125249

(51) Int. Cl.
*H01Q 5/10* (2015.01)
*H01Q 1/22* (2006.01)
*H01Q 1/48* (2006.01)
*H01Q 5/307* (2015.01)
*H01Q 9/04* (2006.01)

(52) U.S. Cl.
CPC ............. *H01Q 5/10* (2015.01); *H01Q 1/2266* (2013.01); *H01Q 1/48* (2013.01); *H01Q 5/307* (2015.01); *H01Q 9/045* (2013.01)

(58) Field of Classification Search
CPC .......... H01Q 1/243; H01Q 5/371; H01Q 9/42; H01Q 5/328; H01Q 1/48; H01Q 5/378; H01Q 1/2266
See application file for complete search history.

(56) References Cited

U.S. PATENT DOCUMENTS

2012/0001815 A1 1/2012 Wong et al.
2013/0021209 A1* 1/2013 Fan ........................ H01Q 5/371 343/700 MS
2014/0009342 A1* 1/2014 Wei ........................ H01Q 21/28 343/700 MS

* cited by examiner

*Primary Examiner* — Wei (Victor) Y Chan
(74) *Attorney, Agent, or Firm* — McClure, Qualey & Rodack, LLP

(57) ABSTRACT

An antenna structure and an electronic device are provided. The electronic device includes a housing and the antenna structure disposed therein. The antenna structure includes a grounding element, a feeding radiation element, a feeding element and a first grounding radiation element. The feeding radiation element includes a first radiating portion, a second radiating portion and a third radiating portion. The first radiating portion and the second radiating portion jointly surround the first grounding radiation element. The first radiating portion is spaced apart from and coupled with the first grounding radiation element to generate a first operating frequency band. The second radiating portion is spaced apart from and coupled with the first grounding radiation element to generate a second operating frequency band. The first operating frequency band is lower than the second operating frequency band.

18 Claims, 9 Drawing Sheets

ANTENNA STRUCTURE AND ELECTRONIC DEVICE

CROSS-REFERENCE TO RELATED PATENT APPLICATION

This application claims the benefit of priority to Taiwan Patent Application No. 111125249, filed on Jul. 6, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure capable of covering multiple frequency bands and an electronic device having the antenna structure.

BACKGROUND OF THE DISCLOSURE

Currently, an exterior design of electronic devices (such as notebook computers or tablet computers) is developed toward being thinner and more lightweight, and screen frames of these electronic devices are gradually reduced in size. Therefore, an internal space of the electronic device that can be used for placement of an antenna is very limited. In response to demand for narrow screen frames, the size of the existing antenna structure also needs to be reduced. However, reduction of the size of the antenna structure will result in a substantial decrease in bandwidth.

Therefore, how to design an antenna structure capable of simultaneously transmitting and receiving multiple wireless frequency bands whilst having good antenna efficiency within the limited internal space of the electronic device has become an important issue in the art.

SUMMARY OF THE DISCLOSURE

In response to the above-referenced technical, the present disclosure provides an antenna structure and an electronic device, which can address an issue of the antenna structure not having a sufficient bandwidth due to miniaturization requirements of the electronic device.

In one aspect, the present disclosure provides an antenna structure, which includes a grounding element, a feeding radiation element, a feeding element, and a first grounding radiation element. The feeding radiation element includes a first radiating portion, a second radiating portion, and a third radiating portion. The first radiating portion is connected to the second radiating portion. The first radiating portion includes a feeding portion and an arm. The third radiating portion is connected to the first radiating portion. The arm of the first radiating portion and the second radiating portion extend along a first direction, the third radiating portion extends along a second direction, and the first direction is different from the second direction. The second radiating portion is in closer proximity to the grounding element than the arm. A grounding end of the feeding element is connected to the grounding element, and a signal end of the feeding element is connected to the first radiating portion or the second radiating portion. The first grounding radiation element is connected to the grounding element. The first radiating portion and the second radiating portion jointly surround the first grounding radiation element, and the first grounding radiation element is located between the first radiating portion and the second radiating portion. The first radiating portion is spaced apart from and coupled with the first grounding radiation element for generating a first operating frequency band. The second radiating portion is spaced apart from and coupled with the first grounding radiation element for generating a second operating frequency band. The first operating frequency band is lower than the second operating frequency band.

In another aspect, the present disclosure provides an electronic device, which includes a housing and an antenna structure disposed in the housing. The antenna structure includes a grounding element, a feeding radiation element, a feeding element, and a first grounding radiation element. The grounding element is electrically connected to the housing. The feeding radiation element includes a first radiating portion, a second radiating portion, and a third radiating portion. The first radiating portion is connected to the second radiating portion. The first radiating portion includes a feeding portion and an arm. The third radiating portion is connected to the first radiating portion. The arm of the first radiating portion and the second radiating portion extend along a first direction, the third radiating portion extends along a second direction, and the first direction is different from the second direction. The second radiating portion is in closer proximity to the grounding element than the arm. A grounding end of the feeding element is connected to the grounding element, and a signal end of the feeding element is connected to the first radiating portion or the second radiating portion. The first grounding radiation element is connected to the grounding element. The first radiating portion and the second radiating portion jointly surround the first grounding radiation element, and the first grounding radiation element is located between the first radiating portion and the second radiating portion. The first radiating portion is spaced apart from and coupled with the first grounding radiation element for generating a first operating frequency band. The second radiating portion is spaced apart from and coupled with the first grounding radiation element for generating a second operating frequency band. The first operating frequency band is lower than the second operating frequency band.

Therefore, in the antenna structure and the electronic device provided by the present disclosure, by virtue of "the first radiating portion and the second radiating portion jointly surrounding the first grounding radiation element, and the first grounding radiation element being located between the first radiating portion and the second radiating portion," the first radiating portion is coupled with the first grounding radiation element for generating the first operating frequency band, and the second radiating portion is coupled with the first grounding radiation element for generating the second operating frequency band. In this way, the electronic device can still satisfy requirements of multiple frequency bands while being miniaturized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
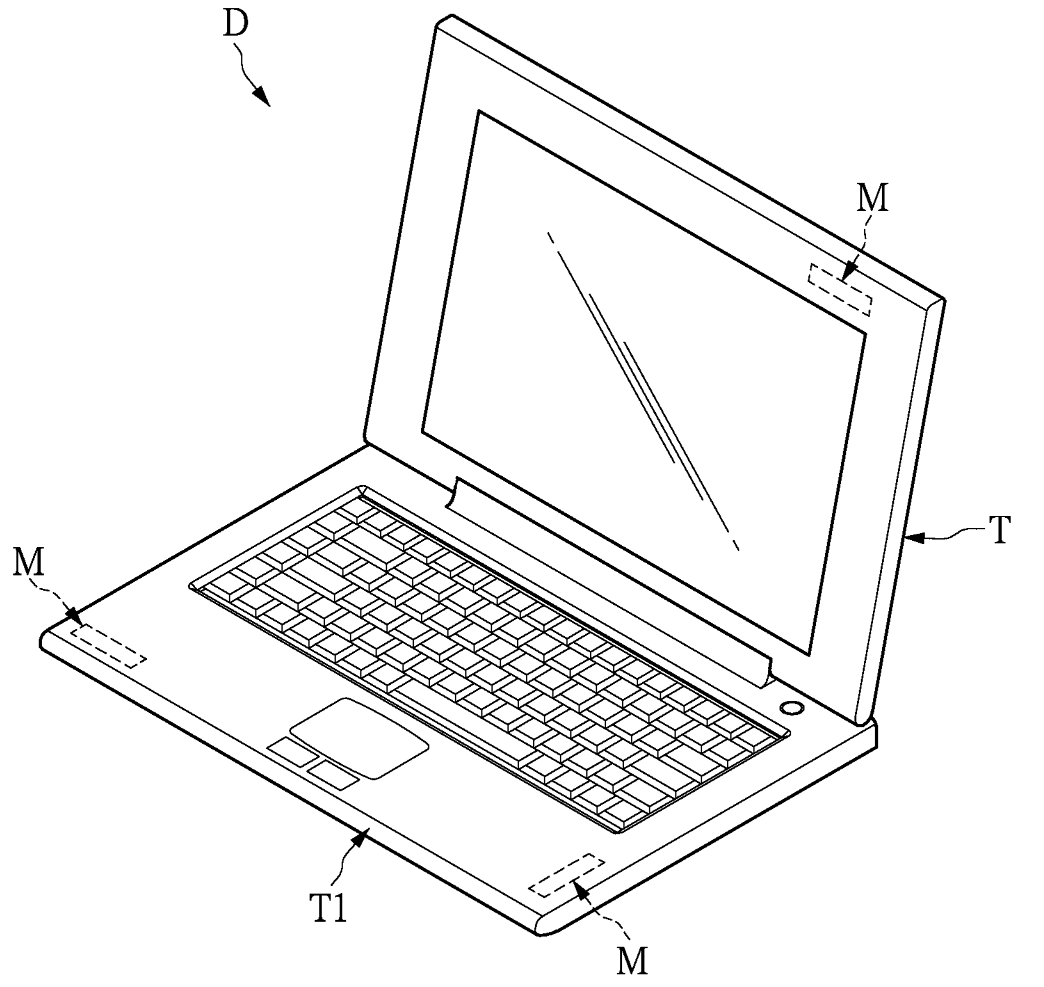
FIG. 1 is a schematic perspective view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

First Embodiment

Referring to FIG. 1, a first embodiment of the present disclosure provides an electronic device D capable of transmitting and receiving wireless radio frequency (RF) signals. For instance, the electronic device D can be a smart phone, a tablet computer, or a notebook computer. In the present disclosure, the electronic device D is exemplified as the notebook computer. However, the present disclosure is not limited thereto. The electronic device D includes an antenna structure M and a housing T (at least one part of the housing T can be a metal housing). The antenna structure M is disposed at a screen frame of the electronic device D, but the position of the antenna structure M in the electronic device D is not limited in the present disclosure. For example, the antenna structure M can also be disposed at a system end T1 of the electronic device D. That is to say, the antenna structure M can be disposed at an inside of the housing with a keyboard (i.e., a C part). A quantity of the antenna structure M is not limited in the present disclosure. The electronic device D can generate at least one operating frequency band through the antenna structure M.

Figure 2:
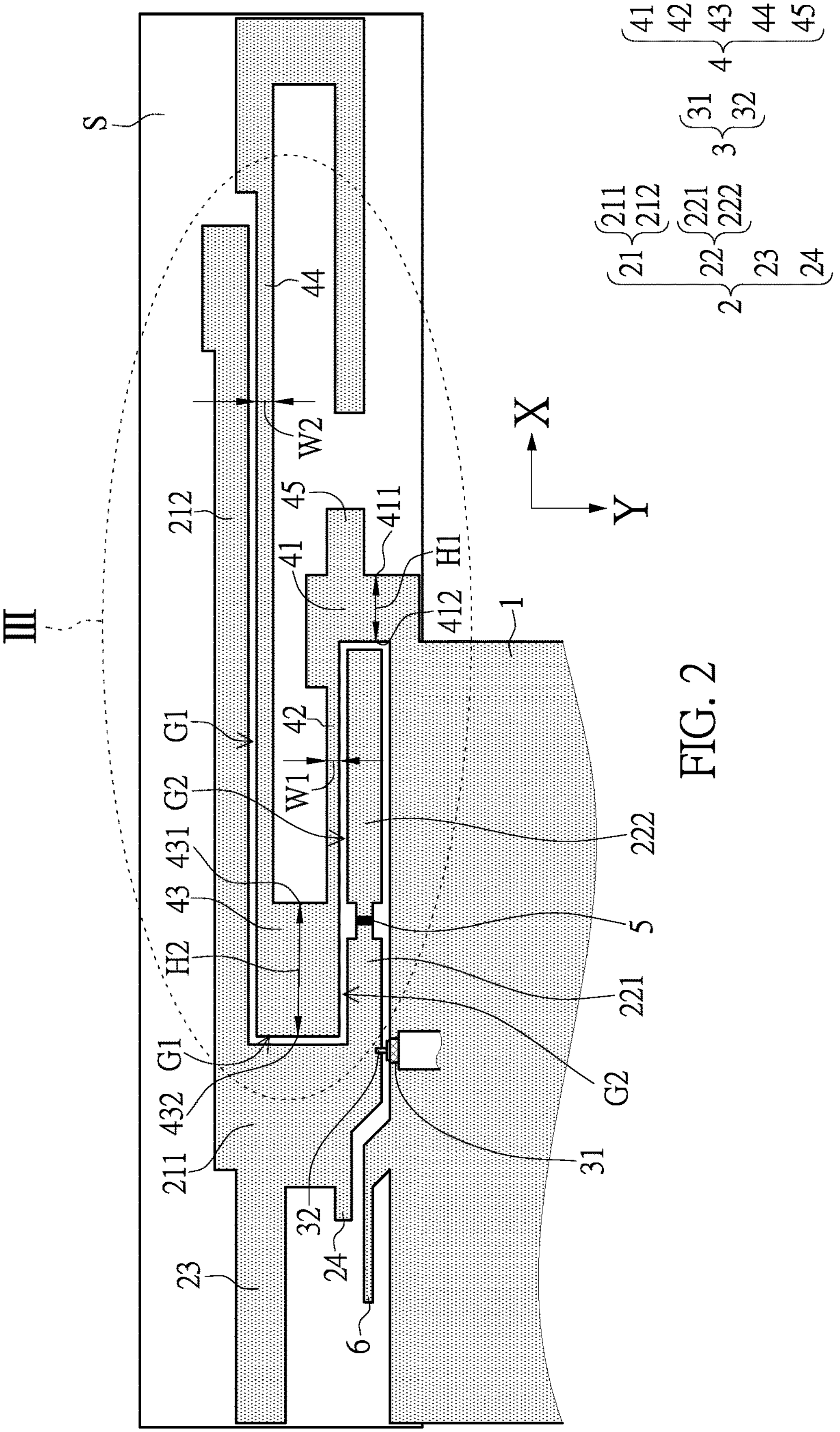
FIG. 2 is a schematic planar view of an antenna structure according to a first embodiment of the present disclosure.

Referring to FIG. 2, FIG. 2 is a schematic planar view of an antenna structure according to a first embodiment of the present disclosure. The antenna structure M includes a grounding element 1, a feeding radiation element 2, a feeding element 3, and a first grounding radiation element 4. The grounding element 1 is electrically connected to a metal portion of the housing T. The feeding radiation element 2 includes a first radiating portion 21, a second radiating portion 22, and a third radiating portion 23. The first radiating portion 21 is connected to the second radiating portion 22 and the third radiating portion 23. The first radiating portion 21 is substantially formed to have an L shape, and the first radiating portion 21 includes a feeding portion 211 and an arm 212. The second radiating portion 22 and the third radiating portion 23 are both connected to the feeding portion 211. A first direction is different from a second direction, in which the arm 212 and the second radiating portion 22 extend along the first direction (i.e., a positive X-axis direction), and the third radiating portion 23 extends along the second direction (i.e., a negative X-axis direction). In addition, as shown in FIG. 2, the second radiating portion 22 is more adjacent to the grounding element 1 than the arm 212.

The feeding element 3 includes a grounding end 31 and a signal end 32. The grounding end 31 is connected to the grounding element 1, and the signal end 32 is connected the feeding radiation element 2. Therefore, the feeding element 3 can feed a signal to the antenna structure M such that the antenna structure M generates at least one operating frequency band. The specific position where the feeding radiation element 2 is connected to the feeding element 3 is not limited in the present disclosure. The signal end 32 of the feeding element 3 is connected to the first radiating portion 21 or the second radiating portion 22. For example, in the present disclosure, the position where the feeding radiation element 2 is connected to the feeding element 3 is located at or near a junction between the first radiating portion 21 and the second radiating portion 22.

The first grounding radiation element 4 is connected to the grounding element 1 and extends in a zigzag manner. The first grounding radiation element 4 is located between the first radiating portion 21 and the second radiating portion 22. The first radiating portion 21 and the second radiating portion 22 are substantially formed be C-shaped and jointly surround the first grounding radiation element 4. The first grounding radiation element 4 includes a first extending portion 41, a second extending portion 42, a third extending portion 43, and a fourth extending portion 44. The first extending portion 41 is connected to the grounding element 1, the second extending portion 42 is connected between the first extending portion 41 and the third extending portion 43, the third extending portion 43 is connected between the second extending portion 42 and the fourth extending portion 44, and the fourth extending portion 44 is connected to the third extending portion 43. One part of the fourth extending portion 44 is parallel to the first radiating portion 21, and another part of the fourth extending portion 44 is bent to form an inverted C shape.

Moreover, the first extending portion 41 has a first side 411 and a second side 412, and the first side 411 and the second side 412 are spaced apart from each other by a first predetermined distance H1. The third extending portion 43 has a third side 431 and a fourth side 432, and the third side 431 and the fourth side 432 are spaced apart from each other by a second predetermined distance H2. The first predetermined distance H1 and the second predetermined distance H2 are greater than or equal to a width W1 of any part of the second extending portion 42 and a width W2 of any part of the fourth extending portion 44.

Reference is further made to FIG. 2. The antenna structure M further includes an inductor 5. In the first embodiment, the second radiating portion 22 can include a first section 221 and a second section 222, and the inductor 5 is connected between the first section 221 and the second section 222. In other words, the first section 221 and the second section 222 are not directly connected to each other, but the present disclosure is not limited thereto. In other embodiments, the antenna structure M can be without the inductor 5, and the first section 221 can be directly connected to the second section 222. An inductance value of the inductor 5 is within a range from 1 nH to 6 nH. In the first embodiment, the inductance value of the inductor 5 is 2.7 nH. In the antenna structure M of the present disclosure, a bandwidth of intermediate frequency bands and matching of the intermediate frequency bands and low frequency bands can be improved through the configuration of the inductor 5.

The antenna structure M further includes a second grounding radiation element 6. The second grounding radiation element 6 is connected to the grounding element 1, and the second grounding radiation element 6 extends along the second direction. The feeding radiation element 2 further includes a fourth radiating portion 24. The fourth radiating portion 24 is connected to the first radiating portion 21, and the fourth radiating portion 24 extends along the second direction. As shown in FIG. 1, the fourth radiating portion 24 is adjacent to the second grounding radiation element 6. The fourth radiating portion 24 is spaced apart from and coupled with the second grounding radiation element 6 for improving a bandwidth and matching of high frequency bands. Furthermore, the first grounding radiation element 4 further includes a fifth extending portion 45. The fifth extending portion 45 is connected to the first extending portion 41, and the fifth extending portion 45 extends along the first direction.

Figure 3:
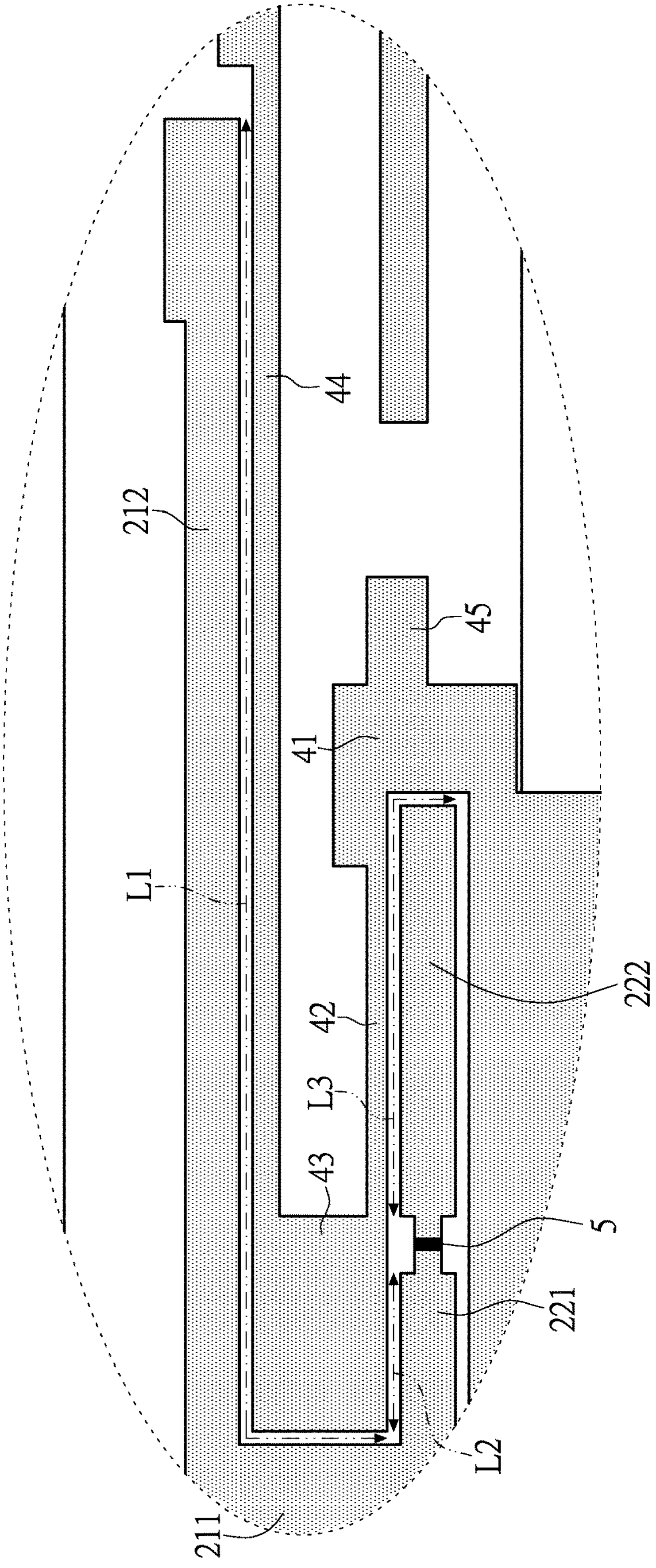
FIG. 3 is a schematic enlarged view of part III of FIG. 2.

Referring to FIG. 2 and FIG. 3, FIG. 3 is a schematic enlarged view of part III of FIG. 2. The first radiating portion 21 and the third extending portion 43 and the fourth extending portion 44 are spaced apart from each other by a first coupling gap G1. As shown in FIG. 3, a length L1 of the first coupling gap G1 is the sum of a gap length between the feeding portion 211 and the third extending portion 43 and a gap length between the arm 212 and the fourth extending portion 44. Hence, the first radiating portion 21 and the first grounding radiation element 4 are spaced apart from each other and coupled with each other, thereby generating a first operating frequency band. The first operating frequency band ranges from 617 MHz to 960 MHz. It is worth mentioning that the first predetermined distance H1 and the second predetermined distance H2 are configured to be greater than the width W1 of any part of the second extending portion 42 and the width W2 of any part of the fourth extending portion 44 in the present disclosure, so as to control a bandwidth and a frequency offset of a low frequency range (i.e., the first operating frequency band).

Reference is further made to FIG. 2 and FIG. 3. The second radiating portion 22 and the first extending portion 41, the second extending portion 42, and the third extending portion 43 are spaced apart from each other by a second coupling gap G2. The second coupling gap G2 includes a length L2 and a length L3. The length L2 is a gap length between the first section 221 and the third extending portion 43, and the length L3 is a gap length between the second section 222 and the first extending portion 41 and the second extending portion 42. Hence, the second radiating portion 22 is spaced apart from and coupled with the first grounding radiation element, such that a second operating frequency band can be generated through adjusting the inductor 5. The second operating frequency band ranges from 1,440 MHz to 1,700 MHz. The first operating frequency band is lower than the second operating frequency band, and a wavelength of the first operating frequency band is longer than a wavelength of the second operating frequency band. As such, the length L1 of the first coupling gap G1 is greater than the length (L2+L3) of the second coupling gap G2.

In addition, a width of any part of the first coupling gap G1 and the second coupling gap G2 is less than or equal to 3 mm. It should be noted that the width of the first coupling gap G1 and the second coupling gap G2 refers to a distance between the first and second radiating portions 21, 22 and the first grounding radiation element 4. For example, the width of the first coupling gap G1 refers to a distance between the feeding portion 211 and the third extending portion 43 and a distance between the arm 212 and the fourth extending portion 44. Moreover, the widths of different parts of the first coupling gap G1 can be equal or unequal. For example, the distance between the feeding portion 211 and the third extending portion 43 does not have to be the same at different positions (but not limited thereto). Similarly, the widths of different parts of the second coupling gap G2 can be equal or unequal (but not limited thereto).

In the following description, other operating frequency bands generated after the signal is fed into the antenna structure M through the feeding element 3 will be illustrated.

The second radiating portion 22 is used for being excited, and is coupled with the grounding element 1 and the first extending portion 41, the second extending portion 42, the third extending portion 43, and the fourth extending portion 44 of the first grounding radiation element 4, such that a third operating frequency band can be generated through adjusting and matching the inductor 5. The third operating frequency band ranges from 1,700 MHz to 2,200 MHz. It is worth mentioning that the second radiating portion 22 is blocked by the first grounding radiation element 4 when the second radiating portion 22 extends along the first direction (as shown in FIG. 2). Therefore, the design of the length of the second radiating portion 22 is limited. In the present disclosure, by connecting the inductor 5 and the second radiating portion 22 in series, a frequency range of the third operating frequency band can be appropriately adjusted by the inductor 5 when the length of the second radiating portion 22 is limited. In this way, the third operating frequency band can be lowered to the desired frequency band (1,700 MHz to 2,200 MHz) by being shifted toward a low frequency, and the matching can be further improved.

The third radiating portion 23 can be excited to generate a fourth operating frequency band. The fourth operating frequency band ranges from 2,200 MHz to 2,700 MHz.

The feeding radiation element 2 and the first extending portion 41, the second extending portion 42, the third extending portion 43, and the fourth extending portion 44 of the first grounding radiation element 4 are coupled with each other, and the fifth extending portion 45 is used for being excited, such that a fifth operating frequency band is generated. The fifth operating frequency band ranges from 3,300 MHz to 3,800 MHz. Furthermore, the fifth extending portion 45 has an effect of expanding the bandwidth and adjusting the matching in the fifth operating frequency band.

The first radiating portion 21 and the third radiating portion 23 are excited to jointly generate a sixth operating frequency band. The sixth operating frequency band ranges from 3,800 MHz to 4,500 MHz.

The second radiating portion 22 and the second grounding radiation element 6 are used for being excited, and the second grounding radiation element 6 and the fourth radiating portion 24 are coupled with each other, such that a seventh operating frequency band is generated. The seventh operating frequency band ranges from 4,500 MHz to 5,500 MHz.

The first extending portion 41, the second extending portion 42, the third extending portion 43, and the fourth extending portion 44 of the first grounding radiation element 4 and the fourth radiating portion 24 are used for being excited, and the second grounding radiation element 6 and the fourth radiating portion 24 are coupled with each other, such that an eighth operating frequency band is generated. The eighth operating frequency band ranges from MHz to 6,000 MHz.

Figure 4:
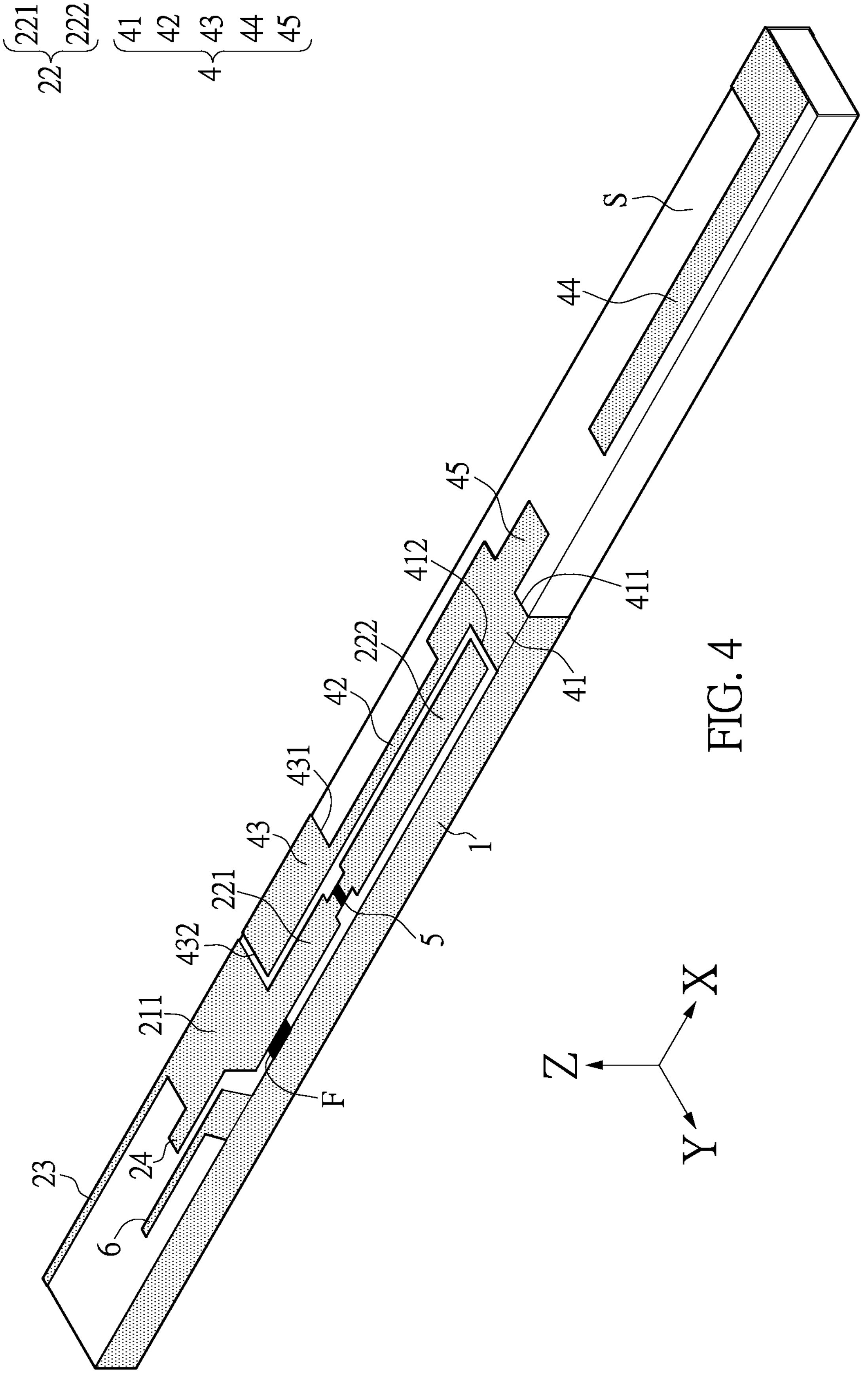
FIG. 4 is a first schematic perspective view of the antenna structure according to the first embodiment of the present disclosure.
Figure 5:
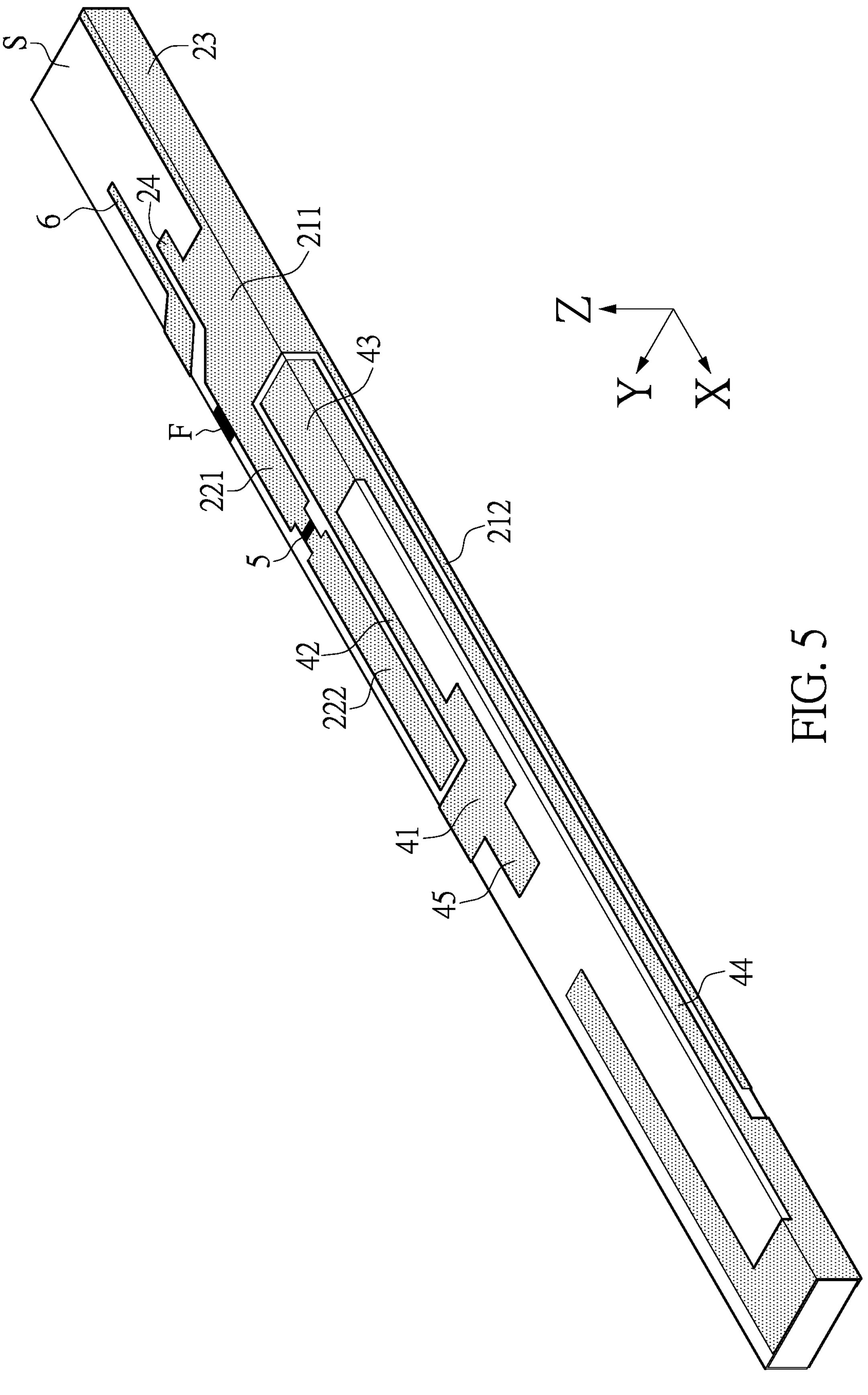
FIG. 5 is a second schematic perspective view of the antenna structure according to the first embodiment of the present disclosure.
Figure 6:
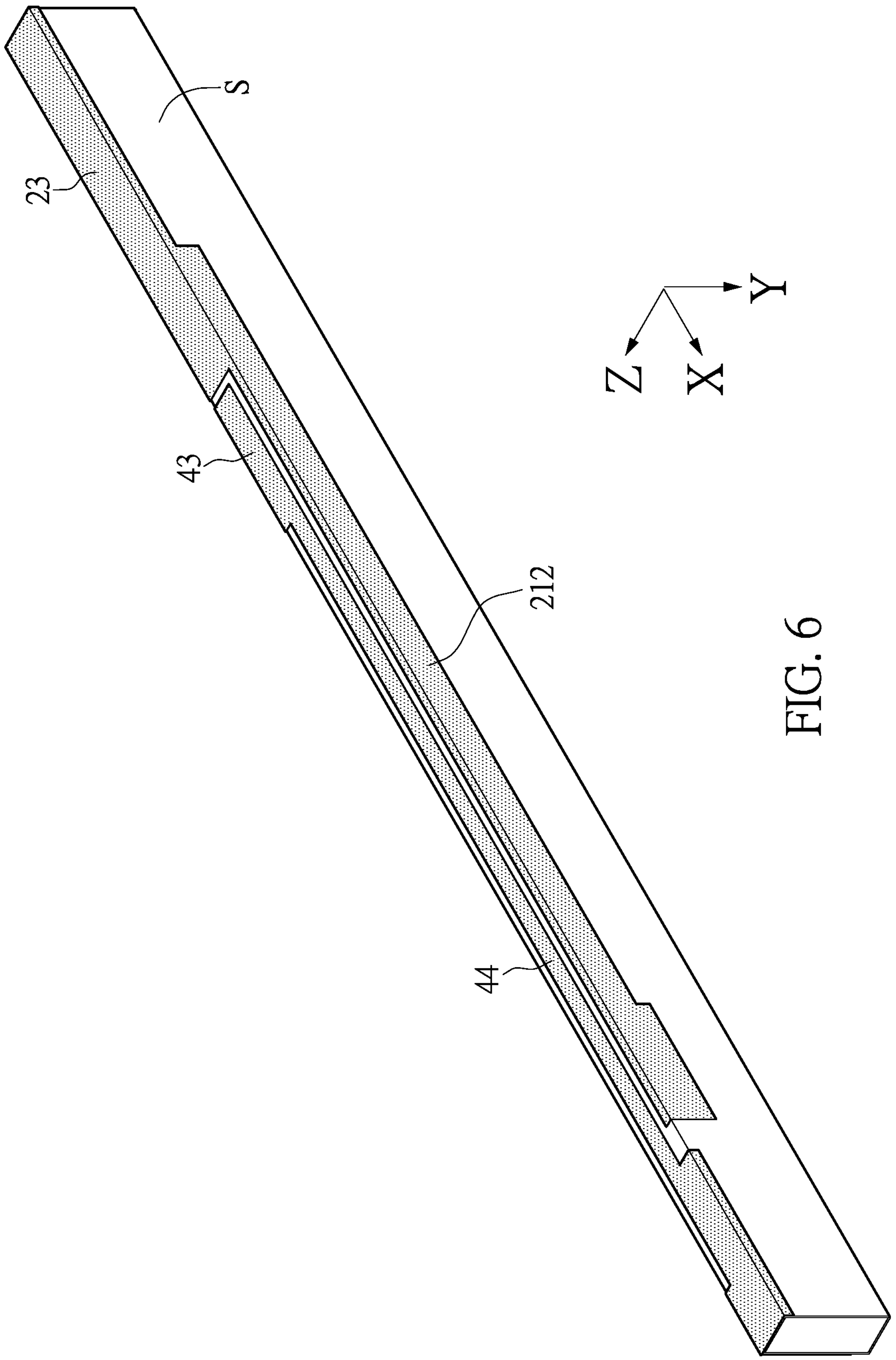
FIG. 6 is a third schematic perspective view of the antenna structure according to the first embodiment of the present disclosure.

Referring to FIGS. 4, 5 and 6, FIGS. 4, 5 and 6 are different schematic perspective views of the antenna structure according to the first embodiment of the present disclosure. A comparison can be made between FIG. 2 and FIGS. 4, and 6. The appearance of the antenna structure M is not limited in the present disclosure, and the antenna structure M can be disposed on a carrier S of different forms. As shown in FIG. 2, the carrier S is a planar structure having a larger size in a Y-axis direction, such that the antenna structure M can be displayed in a fully unfolded form when being disposed on the carrier S. As shown in FIGS. 4, 5 and 6, the carrier S is a three-dimensional structure having a smaller size in the Y-axis direction (the size of the carrier S in the Y-axis direction of FIGS. 4, 5 and 6 is significantly smaller than that of FIG. 2). As such, the size of the antenna structure M in the Y-axis direction is smaller when the antenna structure M is disposed on the carrier S of the three-dimensional structure. It should be noted that a feeding point F in FIGS. 4, 5 and 6 is located at the position of the feeding element 3. In order to fully present the three-dimensional structure of the antenna structure M, the feeding member 3 is omitted in FIGS. 4, 5 and 6. Through the three-dimensional structure, the antenna structure M of the present disclosure can be reduced in size. This allows the antenna structure M to be advantageously installed in the electronic device D with a narrow-framed screen. From another perspective, since the antenna structure M of the present disclosure can be reduced in size through the three-dimensional structure, the electronic device D does not need to reserve too much accommodating space for the screen frame, which is beneficial for allowing the screen of the electronic device D to be designed with a narrow frame.

Second Embodiment

Figure 7:
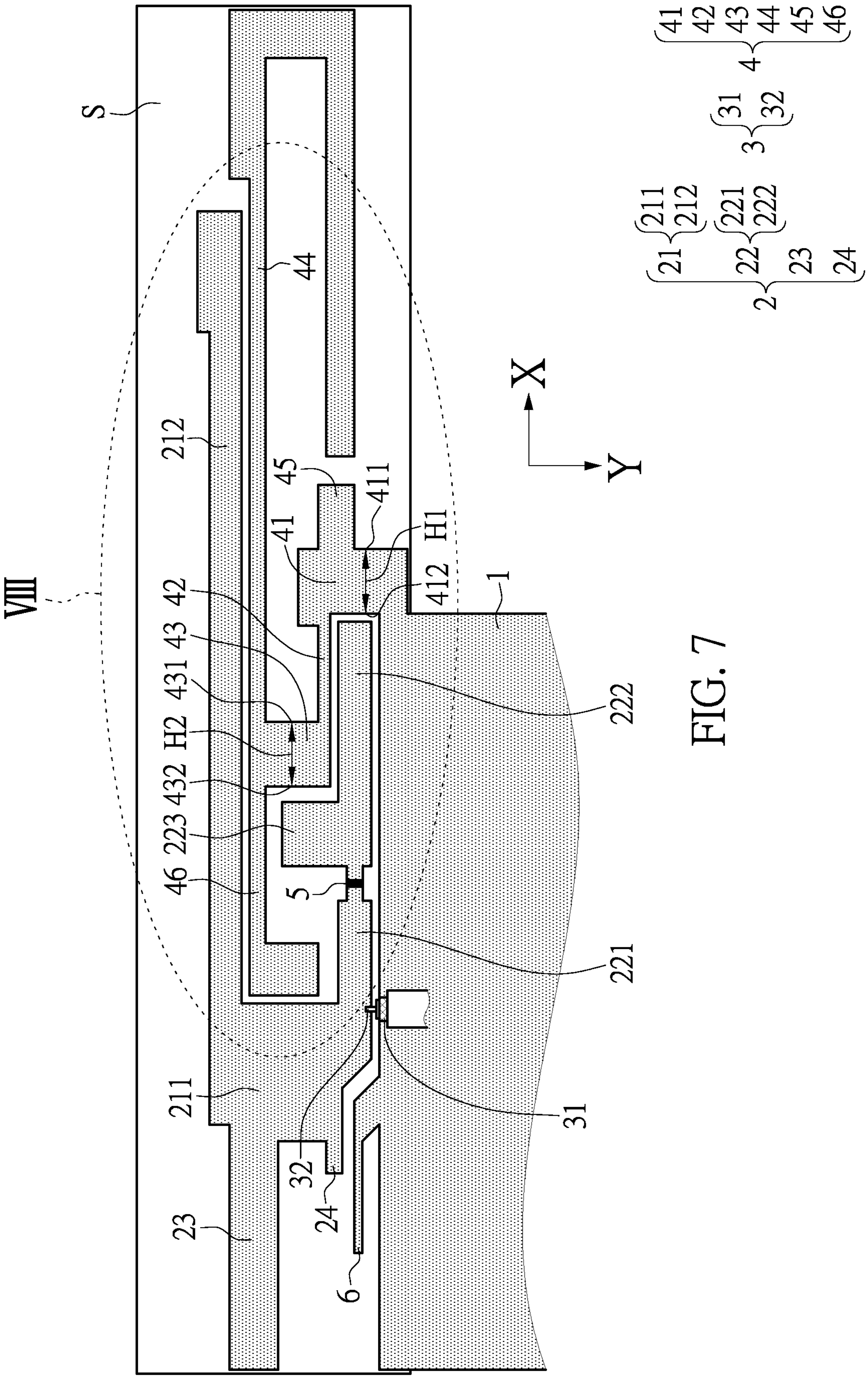
FIG. 7 is a schematic planar view of an antenna structure according to a second embodiment of the present disclosure.
Figure 8:
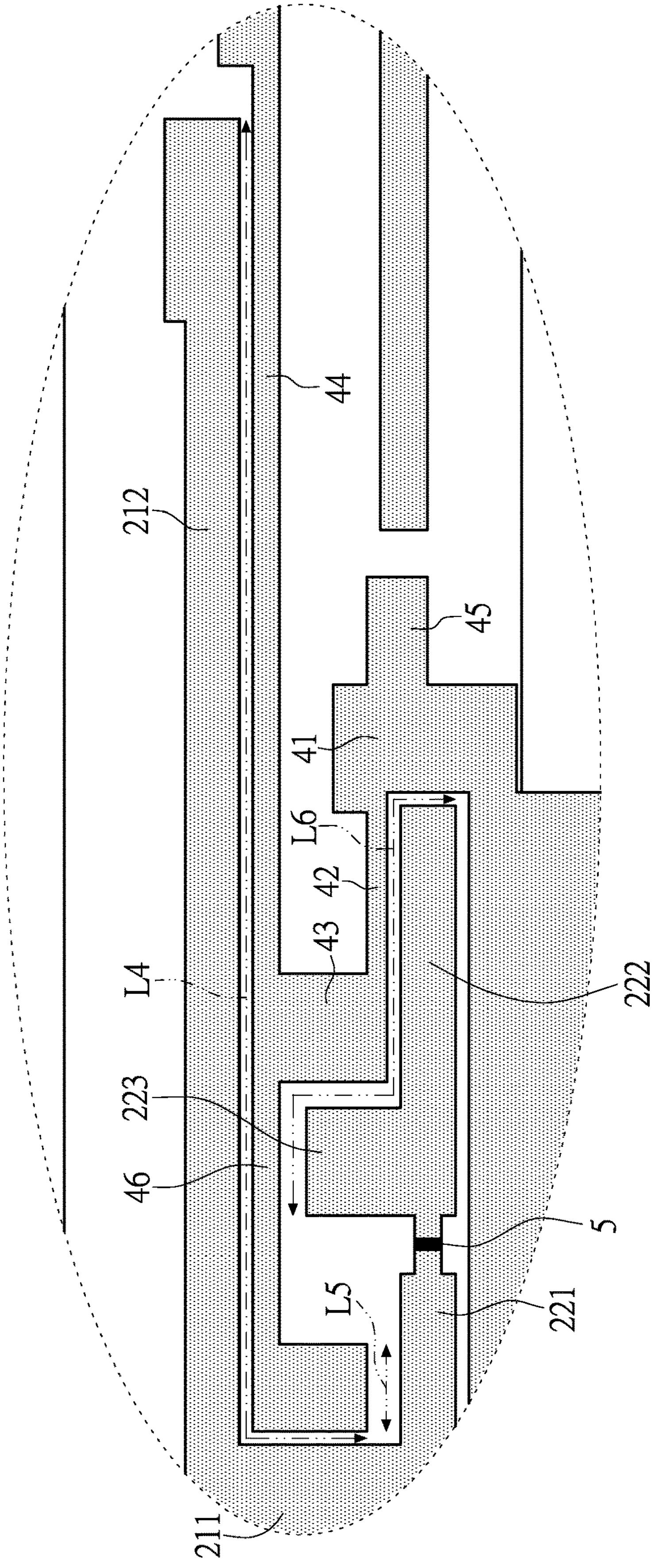
FIG. 8 is a schematic enlarged view of part VIII of FIG. 7.

Referring to FIG. 7 and FIG. 8, FIG. 7 is a schematic planar view of an antenna structure according to a second embodiment of the present disclosure, and FIG. 8 is a schematic enlarged view of part VIII of FIG. 7. The antenna structure M shown in FIG. 7 has a structure similar to that of the antenna structure M shown in FIG. 2, and the similarities will not be reiterated herein. Moreover, the antenna structure M shown in FIG. 7 can also be displayed in a three-dimensional form as shown in FIG. 4, FIG. 5, and FIG. 6, and will not be reiterated hereafter. Specifically, the main difference between the antenna structure M shown in FIG. 7 and the antenna structure M shown in FIG. 2 is as follows. Referring to FIG. 7, the first grounding radiation element 4 of the antenna structure M further includes a sixth extending portion 46, and the sixth extending portion 46 is connected to the third extending 43. The second radiating portion 22 further includes a third section 223, the third section 223 is connected to the second section 222, and the third section 223 extends along a third direction (i.e., a negative Y-axis direction). Accordingly, the antenna structure M can further improve the matching and the radiation efficiency of the intermediate frequency bands (i.e., the second operating frequency band to the fourth operating frequency band) and the high frequency bands (i.e., the fifth operating frequency band to the eighth operating frequency band) through the design of the sixth extending portion 46 and the third section 223. In addition, by series connecting the inductor 5 and the second radiating portion 22, a resonance frequency of the antenna structure M can be appropriately shifted toward the low frequency and be lowered to the desired frequency band. In this way, not only can the bandwidth of the intermediate frequency bands be improved, but the matching of the low frequency bands (i.e., the first operating frequency band) and the high frequency bands (i.e., the second operating frequency band to the fourth operating frequency band) can also be improved.

The first radiating portion 21 is spaced apart from the third extending portion 43, the fourth extending portion 44, and the sixth extending portion 46 by a first coupling gap G1. As shown in FIG. 8, in the second embodiment, a length L4 of the first coupling gap G1 includes a gap length between the feeding portion 211 and the sixth extending portion 46 and a gap length between the arm 212 and the sixth extending portion 46, the third extending portion 43, and the fourth extending portion 44.

The second radiating portion 22 is spaced apart from the first extending portion 41, the second extending portion 42, the third extending portion 43, and the sixth extending portion 46 by a second coupling gap G2. As shown in FIG. 8, in the second embodiment, a length of the second coupling gap G2 is the sum of a length L5 and a length L6. The length L5 is a gap length between the first section 221 and the sixth extending portion 46. The length L6 is a gap length between the second section 222 and the third section 223 of the second radiating portion 22 and the first extending portion 41, the second extending portion 42, the third extending portion 43, and the sixth extending portion 46. Moreover, since the first operating frequency band is lower than the second operating frequency band, the wavelength of the first operating frequency band is longer than the wavelength of the second operating frequency band. Therefore, the length L4 of the coupling gap G1 is greater than the length (L5+L6) of the coupling gap G2.

Beneficial Effects of the Embodiments

Figure 9:
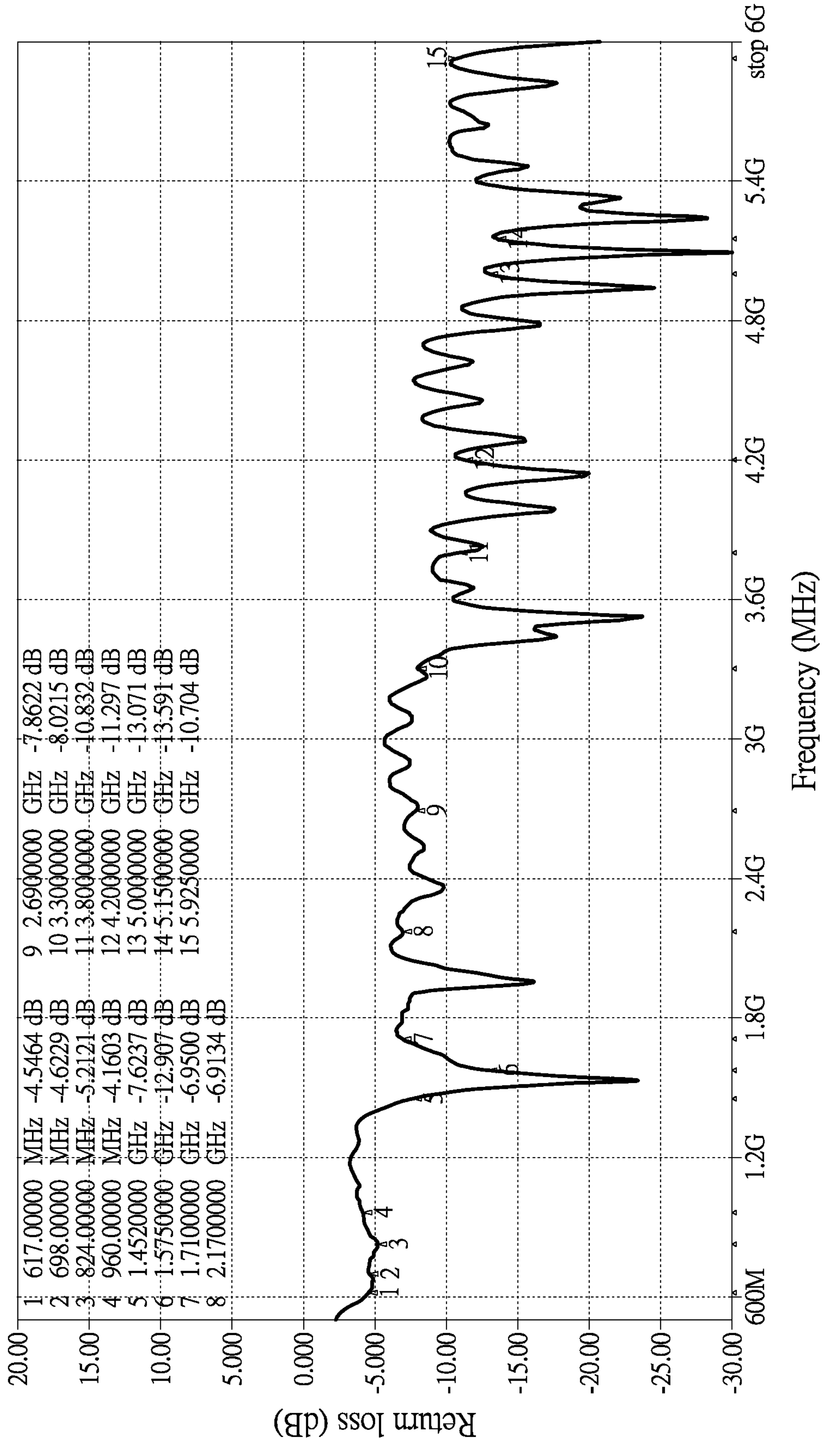
FIG. 9 is a curve diagram showing a return loss of the antenna structure according to the first embodiment of the present disclosure.

Referring to FIG. 9, FIG. 9 is a curve diagram showing a return loss of the antenna structure according to the first embodiment of the present disclosure. FIG. 9 shows return loss curves of multi-operating frequency bands (i.e., the first operating frequency bands to the eighth operating frequency bands) generated by the antenna structure M. In the electronic device D provided by the present disclosure and the antenna structure M disposed therein, by virtue of "the first radiating portion 21 and the second radiating portion 22 jointly surrounding the first grounding radiation element 4, and the first grounding radiation element 4 being located between the first radiating portion 21 and the second radiating portion 22," the first radiating portion 21 is coupled with the first grounding radiation element 4 for generating the first operating frequency band in the low frequency range, and the second radiating portion 22 is coupled with the first grounding radiation element 4 for generating the second operating frequency band in an intermediate frequency range.

Furthermore, the antenna structure M further includes the inductor 5. In the present disclosure, the inductor 5 is series connected to the second radiating portion 22, such that the resonance frequency generated by the antenna structure M can be appropriately shifted toward the low frequency and be lowered to the desired frequency band. In this way, not only can the bandwidth of the intermediate frequency bands be improved, but the matching of the low frequency bands (i.e., the first operating frequency band) and the high frequency bands (i.e., the second operating frequency band to the fourth operating frequency band) can also be improved. The antenna structure M can further include the third radiating portion 23, the fourth radiating portion 24, and the second grounding radiation element 6, so as to generate an operating frequency band in a high frequency range. Accordingly, the operating frequency band produced by the antenna structure M can cover a frequency range from 617 MHz to 5,925 MHz. Hence, the electronic device D and the antenna structure M can still satisfy requirements of multiple frequency bands despite being miniaturized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a grounding element;

a feeding radiation element including a first radiating portion, a second radiating portion, and a third radiating portion, wherein the first radiating portion is connected to the second radiating portion, the first radiating portion includes a feeding portion and an arm, the third radiating portion is connected to the first radiating portion, the arm and the second radiating portion extend along a first direction, the third radiating portion extends along a second direction, the first direction is different from the second direction, and the second radiating portion is more adjacent to the grounding portion than the arm;

a feeding element including a grounding end and a signal end, wherein the grounding end is connected to the grounding element, and the signal end is connected to the first radiating portion or the second radiating portion; and a first grounding radiation element connected to the grounding element, wherein the first radiating portion and the second radiating portion jointly surround the first grounding radiation element, and the first grounding radiation element is located between the first radiating portion and the second radiating portion;

wherein the first radiating portion is spaced apart from and coupled with the first grounding radiation element for generating a first operating frequency band, the second radiating portion is spaced apart from and coupled with the first grounding radiation element for generating a second operating frequency band, and the first operating frequency band is lower than the second operating frequency band.

2. The antenna structure according to claim 1, further comprising an inductor, wherein the second radiating portion includes a first section and a second section, the first section is connected to the feeding element, and the inductor is connected between the first section and the second section.

3. The antenna structure according to claim 2, further comprising a second grounding radiation element connected to the grounding element, wherein the feeding radiation element further includes a fourth radiating portion, the fourth radiating portion is connected to the first radiating portion and adjacent to the second grounding radiation element, and the fourth radiating portion is spaced apart from and coupled with the second grounding radiation element.

4. The antenna structure according to claim 2, wherein the first grounding radiation element includes a first extending portion, a second extending portion, a third extending portion, and a fourth extending portion, the first extending portion is connected to the grounding element, the second extending portion is connected between the first extending portion and the third extending portion, the third extending portion is connected between the second extending portion and the fourth extending portion, the fourth extending portion is connected to the third extending portion, and one part of the fourth extending portion is parallel to the first radiating portion.

5. The antenna structure according to claim 4, wherein the first radiating portion is spaced apart from the third extending portion and the fourth extending portion by a first coupling gap, the second radiating portion is spaced apart from the first extending portion, the second extending portion, and the third extending portion by a second coupling gap, and a length of the first coupling gap is greater than a length of the second coupling gap.

6. The antenna structure according to claim 4, wherein the first extending portion has a first side and a second side, the third extending portion has a third side and a fourth side, the first side and the second side are spaced apart from each other by a first predetermined distance, the third side and the fourth side are spaced apart from each other by a second predetermined distance, and the first predetermined distance and the second predetermined distance are both greater than or equal to a width of any part of the second extending portion and the fourth extending portion.

7. The antenna structure according to claim 4, wherein the first grounding radiation element further includes a fifth extending portion, the fifth extending portion is connected to the first extending portion, and the fifth extending portion extends along the first direction.

8. The antenna structure according to claim 7, wherein the first grounding radiation element further includes a sixth extending portion, the sixth extending portion is connected to the third extending portion, the second radiating portion further includes a third section, and the third section is connected to the second section.

9. The antenna structure according to claim 8, wherein the first radiating portion is spaced apart from the third extending portion, the fourth extending portion, and the sixth extending portion by a first coupling gap, the second radiating portion is spaced apart from the first extending portion, the second extending portion, the third extending portion, and the sixth extending portion by a second coupling gap, and a length of the first coupling gap is greater than a length of the second coupling gap.

10. An electronic device, comprising:

a housing; and an antenna structure disposed in the housing, wherein the antenna structure includes:

a grounding element electrically connected to the housing;

a feeding radiation element including a first radiating portion, a second radiating portion, and a third radiating portion, wherein the first radiating portion is connected to the second radiating portion, the first radiating portion includes a feeding portion and an arm, the third radiating portion is connected to the first radiating portion, the arm and the second radiating portion extend along a first direction, the third radiating portion extends along a second direction, the first direction is different from the second direction, and the second radiating portion is more adjacent to the grounding portion than the arm;

a feeding element including a grounding end and a signal end, wherein the grounding end is connected to the grounding element, and the signal end is connected to the first radiating portion or the second radiating portion; and a first grounding radiation element connected to the grounding element, wherein the first radiating portion and the second radiating portion jointly surround the first grounding radiation element, and the first grounding radiation element is located between the first radiating portion and the second radiating portion;

wherein the first radiating portion is spaced apart from and coupled with the first grounding radiation element for generating a first operating frequency band, the second radiating portion is spaced apart from and coupled with the first grounding radiation element for generating a second operating frequency band, and the first operating frequency band is lower than the second operating frequency band.

11. The electronic device according to claim 10, further comprising an inductor, wherein the second radiating portion includes a first section and a second section, the first section is connected to the feeding element, and the inductor is connected between the first section and the second section.

12. The electronic device according to claim 11, further comprising a second grounding radiation element connected to the grounding element, wherein the feeding radiation element further includes a fourth radiating portion, the fourth radiating portion is connected to the first radiating portion and adjacent to the second grounding radiation element, and the fourth radiating portion is spaced apart from and coupled with the second grounding radiation element.

13. The electronic device according to claim 11, wherein the first grounding radiation element includes a first extending portion, a second extending portion, a third extending portion, and a fourth extending portion, the first extending portion is connected to the grounding element, the second extending portion is connected between the first extending portion and the third extending portion, the third extending portion is connected between the second extending portion and the fourth extending portion, and the fourth extending portion is connected to the third extending portion; wherein one part of the fourth extending portion is parallel to the first radiating portion.

14. The electronic device according to claim 13, wherein the first radiating portion is spaced apart from the third extending portion and the fourth extending portion by a first coupling gap, the second radiating portion is spaced apart from the first extending portion, the second extending portion, and the third extending portion by a second coupling gap, and a length of the first coupling gap is greater than a length of the second coupling gap.

15. The electronic device according to claim 13, wherein the first extending portion has a first side and a second side, the third extending portion has a third side and a fourth side, the first side and the second side are spaced apart from each other by a first predetermined distance, the third side and the fourth side are spaced apart from each other by a second predetermined distance, and the first predetermined distance and the second predetermined distance are both greater than or equal to a width of any part of the second extending portion and the fourth extending portion.

16. The electronic device according to claim 13, wherein the first grounding radiation element further includes a fifth extending portion, the fifth extending portion is connected to the first extending portion, and the fifth extending portion extends along the first direction.

17. The electronic device according to claim 16, wherein the first grounding radiation element further includes a sixth extending portion, the sixth extending portion is connected to the third extending portion, the second radiating portion further includes a third section, and the third section is connected to the second section.

18. The electronic device according to claim 17, wherein the first radiating portion is spaced apart from the third extending portion, the fourth extending portion, and the sixth extending portion by a first coupling gap, the second radiating portion is spaced apart from the first extending portion, the second extending portion, the third extending portion, and the sixth extending portion by a second coupling gap, and a width of any part of the first coupling gap and the second coupling gap is smaller than or equal to 3 mm.

* * * * *